United States Patent Office 3,311,459
Patented Mar. 28, 1967

3,311,459
CHEMICAL HEATING DEVICE IN SHEET FORM
Thomas Francis, Toronto, Ontario, and Maurice H. Jones, Scarborough, Ontario, Canada, assignors to Ontario Research Foundation, Toronto, Ontario, Canada
No Drawing. Filed Dec. 12, 1963, Ser. No. 329,982
14 Claims. (Cl. 44—3)

This invention relates to a chemical heating device. More particularly, this invention relates to a chemical heating device in the form of a thin, flexible sheet.

Chemical heating devices which rely upon the heat liberated as a result of an exothermic chemical reaction between a mixture of selected chemicals are relatively well known and have been previously described and patented. A well known example of such a device is that employing the "Thermite" or "Goldschmidt" process (Encyclopedia of Chemical Technology, vol. 13, p. 940) which is widely used for the welding of metals and in other applications. This process relies upon the exothermic heat of reaction liberated when, for example, iron oxide is reduced to metallic iron by means of elemental aluminum. This mixture liberates 850 cal./gm., and the temperature attained is sufficient to melt the iron and permit it to separate from the alumina slag formed. Another example of a chemical heating composition is that used in the so-called "self-heating food cans" (W. A. Caldwell & J. Gillies, Ind. Chemist, 26, 301, 1950) which were widely used by troops in the field during the Second World War. Like the Goldschmidt process and other pyrotechnic heating processes, the self-heating food can utilizes the heat evolved from the reaction of an oxidizable material or fuel (calcium silicide) which one or more oxidants (iron oxide). This mixture of iron oxide and calcium silicide liberates 575 cal./gm. and attains an estimated reaction temperature of 1500° C. The process designed to apply rubber patches to rubber tires in cases of emergencies makes use of a pyrotechnic heating source.

In general, in order to achieve maximum efficiency from the chemicals used in chemical heating devices, the fuel and oxidant are ground to a very small particle size and are thoroughly mixed together thus ensuring that the components of the mixture are in intimate contact, which favours self-propagation and complete reaction by the presentation of a large surface area of contact between the reactants. For many applications the evolution of gas or smoke during burning of the heating device is undesirable, so that the so-called "gasless" pyrotechnic compositions are more generally used than those materials which evolve gas, smoke or flame. For certain applications the latter have the added disadvantage that the efficiency of the device is decreased by loss of heat in the form of hot gases.

For many purposes, and in many end uses, the chemical heating compositions are used in the form of a powder which may, if desired, be loosely packed or compressed into cartridges or tubes. Alternatively, the powder may be consolidated by compression or other conventional means into pellets, blocks or the like and used in this form. However, in some applications, particularly where it is desirable or advantageous to heat large surfaces or surfaces of complex shape rapidly and uniformly to elevated temperatures, heating devices in the form of powders, pellets or blocks are of limited use, and a device in the form of a thin flexible sheet or roll is required. The flexibility of such as sheet permits uniform predistribution of the chemicals over the surface to be heated and, consequently, a uniform heat distribution in a novel manner which can not be achieved with powders and the like by themselves.

Accordingly, it is an important object of this invention to provide a self-propagating, chemical heating device which is in the form of a thin, flexible sheet similar to a sheet of paper.

The present invention therefore relates to a chemical heating device in the form of a thin, flexible sheet and to a method for making such sheets from finely powdered materials, at least one of which is insoluble in water, adapted to undergo exothermic chemical reaction with each other and a fibrous binding material that at least includes asbestos.

A self-propagating chemical heating device embodying this invention is in the form of a thin, flexible sheet that is paper-like in physical structure, i.e., comprised of a matrix of intermingled fibres. The sheet comprises a fibrous binding material such as asbestos or mixtures of asbestos and fiberglass, and a composition of matter which is bound by the fibrous binding material, the composition of matter comprising a mixture of powdered materials adapted to undergo exothermic chemical reaction with each other upon ignition and at least one component of which is insoluble in water.

In carrying out one process for making such a chemical heating device, a mixture of the finely powdered reactants is blended, preferably in a suitably inert liquid medium such as water or any organic liquid which does not undergo reaction at normal ambient temperatures with the reactants, which is not a solvent for the reactants, and which possesses sufficient volatility to permit its ready removal during drying of the sheet, with a quantity of a fibrous binding material at least including loose asbestos fibres. The slurry or pulp so obtained then is treated by any of several conventional practices or procedures of filtration to yield a paper-like material which, after drying, is flexible and, upon ignition, burns at a rate and in a manner comparable to that of a layer of equivalent thickness of the unbound, powdered reactants.

The advantages of using the aforementioned technique, as opposed to alternative methods of binding the powdered reactants such as pelletizing, compressing the reactants into sheet form and binding the reactants with organic binders such as nitrocellulose, and the advantages of the resultant chemical heating device embodying this invention are numerous. Thus, only a small amount of the fibrous binder is required to obtain a flexible sheet, and the fibrous binder does not, when used in sufficiently small amounts, adversely affect the burning characteristics of the reactants. It should be pointed out that compositions which fail to burn in a self-propagating manner in the form of a thin uniform layer of the unbound reactants will, of course, also fail to burn when compounded with a fibrous binder such as asbestos into the form of a thin, flexible sheet. The asbestos fibres do not give rise to significant amounts of gaseous decomposition products during burning of the device. In contrast to this, organic type bonding agents, for example, nitrocellulose or similar oxidizable or flammable materials, are unsuitable since, even in small amounts, they give rise to undesirable gaseous by-products and can seriously interfere with the burning properties of the powdered reactants. As an illustration, a mixture of iron powder (70% by weight) and sulphur powder (30% by weight) can be bound with 5% by weight of nitrocellulose, based on the weight of the mixture, and the product cast in the form of a thin sheet. The sheet has no flexibility, is brittle and rigid, and burns much less readily than an equivalent layer of the unbound mixture of iron and sulphur. This latter effect is presumed to arise from the decreased area of contact between the iron and sulphur particles which become individually coated with a layer of the bonding agent. No such interference with the burning reactions is caused by the use of a small percentage of asbestos fibre as the bonding agent. Thus, using the process of the present invention it is possible to convert a similar mixture of iron and sulphur into a thin, flexible sheet by the use of 5% of asbestos fibre as the bonding agent. The burning characteristics of the asbestos-bound mixture of reactants are comparable to those of an equivalent layer of an intimate mixture of the unbound powdered reactants.

Preferred chemical materials which can be used in a chemical heating device embodying this invention are the so-called "gasless" pyrotechnic mixtures. Specific examples of these are mixtures, in finely powdered form, of iron and sulphur; iron, small amounts of zinc and sulphur; lead and sulphur; iron, lead and sulphur, iron oxide ($Fe_2O_3$) and calcium silicide; iron oxide ($Fe_3O_4$) and calcium silicide; lead oxide ($Pb_3O_4$) and calcium silicide; and mixtures of aluminum, silicon and lead chromate. However, it should not be inferred that the present invention is limited to any one of these mixtures since any reactants which undergo exothermic chemical reaction with each other upon ignition and which will burn in a self-propagating manner when compounded with the small amount of the fibrous material required to convert the powder to sheet form may be employed. A preferred mixture is iron powder (75% to 65% by weight) and sulphur powder (25% to 35% by weight).

The amount of asbestos fibre that can be used in converting the powdered reactants to sheet form may be as low as 2% or less by weight based on the weight of the reactants. Large amounts of the fibrous additive can interfere with or result in complete loss of the self-propagating properties of the reactants. For a mixture of iron powder (75% to 65% by weight) and sulphur powder (25% to 35% by weight), asbestos fibre can be used in amounts ranging from about 2-20% by weight of the powdered mixture, but these values, in particular the upper limit of asbestos content, may vary to some extent with the particular powdered reactants employed. For most pyrotechnic compositions an asbestos content in the sheet in the range of 2-10% is usually satisfactory.

The heat output of the heating sheets of the present invention is controlled mainly by the pyrotechnic composition employed and the thickness of the sheet. Sheet thickness must not be decreased below a definite lower level since, below this level, the self-propagating burning properties of the device are lost. For example, a chemical heating device embodying this invention and in the form of a thin, flexible sheet composed of iron powder (75%-65% by weight), sulphur powder (25%-35% by weight) and 2-20% by weight of the aforementioned mixture of asbestos fibres or of a mixture of asbestos and glass fibres (equal proportions of glass and asbestos fibres) are self-propagating only when their weight per unit area is in excess of about 0.05 g./sq. cm. (0.1 lb./sq. ft.). This lower level of thickness for self-propagation of burning varies with the pyrotechnic composition employed, of course. It is important, of course, in the preparation of the sheet that the components of the pyrotechnic composition be distributed uniformly throughout the sheet to ensure that self-propagation not be stopped on account of areas of the sheet failing to have either the correct composition or sufficient total pyrotechnic material. Flexibility of the sheet also is dependent upon sheet thickness and, consequently, the upper limit of sheet thickness is dictated by the requirements of flexibility in the end use of the sheet. In applications where relatively thick but flexible sheets are required, recourse can be taken to the use of multiple layers of thin sheets each embodying this invention.

Since for any particular pyrotechnic heating sheet there is a lower limit of thickness below which the burning reaction fails to be self-propagating, it is not possible to reduce indefinitely the heat emitted per unit area of the sheet by simply preparing sheets of reduced thickness. However, if desired, sheets of lowered heat output per unit area can be prepared by reducing the effective area of the heating sheet. This can be accomplished, for example, by punching out areas of the sheet to yield a sheet with a mesh-like structure. Alternatively, mesh-type sheets can be prepared directly during formation of the sheet from the pyrotechnic pulp.

The chemical heating devices of the present invention, being composed, for the most part of a finely divided powder, are understandably of somewhat low tensile strength. The strength of the sheet is somewhat dependent upon the amount of fibrous material used to bind the powdered pyrotechnic composition. One method for improving the strength characteristics of the pyrotechnic sheets is to laminate the sheet between two, thin asbestos papers during its preparation, and thus make use of inter-fibre friction to hold the three layers of the laminate together. Mesh-type pyrotechnic sheets are preferably bonded between supporting asbestos paper during their preparation.

If desired, part of the asbestos fibres used to bind the powdered pyrotechnic composition can be replaced by glass fibres, but in the event that a mixture of asbestos and glass fibres is employed, the amount of asbestos fibres in the sheet should constitute not less than about 1% by weight of the powdered pyrotechnic composition. The thin outer papers which may be used in constructing a laminated chemical heating device embodying this invention may consist of mixtures of glass and asbestos fibres as well. These thin outer papers should have a glass content not exceeding 90% by weight of the papers themselves.

The major potential uses of the chemical heating devices of the present invention are expected to arise from their ability to heat large surfaces or surfaces of complex shape uniformly and rapidly. Specific examples of the use of a thin, flexible, pyrotechnic heating sheet based upon a mixture of powdered iron and sulphur and bound with abestos fibre are set out in copending application Ser. No. 330,020, filed Dec. 12, 1963, for "Flexible, Self-Expandable and Self-Contained Unit" by Thomas Francis, J. Furrer, M. H. Jones, G. Murray and M. P. Thorne. In this particular application the heat output of the flexible pyrotechnic sheet is used to raise the temperature of an adjacent flexible layer of a foamable composition of matter. The latter layer is designed in such a way that, when raised to a definite initation temperature, it undergoes expansion and rigidization to produce a layer of rigid foamed plastic. This combination of pyrotechnic and foamable sheets is expected to find use in the rapid construction of foamed houses in isolated areas, in the "in situ" formation of foamed life rafts during emergencies and in other applications.

The following examples illustrate the method employed in preparing thin, flexible heating sheets of various compositions embodying this invention. They are not meant to limit either the pyrotechnic compositions that can be obtained in sheet form by the use of asbestos alone or with other suitable non-combustile fibrous materials, or the method that may be employed to mix the pyrotechnic compositions with the fibrous materials and convert the mixture to sheet form.

*Example I*

Iron powder (63 g.) of mean particle size from 5–20 microns was mixed with sulphur powder (27 g.) of similar particle size in a ball mill for 1 hour. The resultant mixture (90 g.), asbestos fibre (5 g.) and glass fibre (5 g.) were added to methanol (450 ml.) in a blender, and the mixture was blended for 2 minutes to give a homogeneous pulp-like material. This pulp was spread uniformly on the filter head of a rectangular vacuum filter having a surface area of 800 sq. cm., sucked almost to dryness and then air dried to yield a thin, flexible, heating sheet having a weight per unit area of 0.125 gm./cm.² This sheet burned at a rate of approximately 0.5 cm./sec. (1.0 ft./min.) and attained a temperature of about 650° C. with the evolution of very little smoke or flame. The sheet also burned readily, even in the absence of atmospheric oxygen and even when precooled in liquid nitrogen.

*Example II*

Example I was repeated using water as the blending medium. In this case it was necessary to use a small amount of a wetting agent to obtain a homogeneous product.

*Example III*

Example I was repeated using a mixture of lead oxide ($Pb_3O_4$) (70 g.), calcium silicide (30 g.) and asbestos fibre (5 g.). The pyrotechnic sheet so prepared burned rapidly with the evolution of a small amount of smoke.

*Example IV*

Example I was repeated using asbestos fibre (5 g.) to bind a mixture of iron oxide ($Fe_3O_4$) (50 g.) and calcium silicide (50 g.). The pyrotechnic sheet of this example burned rapidly and evolved very little gas.

*Example V*

Example I was repeated using a mixture of iron oxide ($Fe_2O_3$) (50 g.) and calcium silicide (50 g.). The pyrotechnic sheet so prepared burned rapidly and there was no smoke or gas evolution during burning.

*Example VI*

Asbestos fibre (10 g.) was blended in methanol (500 ml.) in a blender for 2-3 minutes. The resultant pulp was spread uniformly over the filter head of a rectangular vacuum filter having an area of 800 sq. cm. and sucked almost to dryness. The pulp obtained from blending iron powder (35 g.), sulphur (16 g.), glasswool (3 g.) and asbestos fibre (3 g.) in methanol (400 ml.) for 2 minutes then was poured carefully onto the filter bed and sucked almost to dryness. A third pulp prepared from asbestos fibre (10 g.) in methanol (400 ml.) was poured carefully onto the filter head and filtered to dryness. The product from this procedure was a pyrotechnic sheet which is laminated between two thin, asbestos sheets, the three layers of the laminate being held together by interfibre friction between the layers.

*Example VII*

Asbestos fibre (10 g.) was blended in methanol (500 ml.) in a blender for 2-3 minutes. The pulp produced was vacuum filtered almost to dryness. Iron powder (19 g.), sulphur powder (8 g.), glasswool (1.5 g.) and asbestos fibre (1.5 g.) were blended in methanol (600 ml.) to yield a pulp which was carefully poured onto the filter head. A solid rubber mold grooved in a cross-hatch pattern was pressed into the pulp and contacted the filter head. In this way the pulp was forced into the grooves of the mold and, on filtration almost to dryness, a product distributed in a mesh arrangement on the filter head was produced. This was carefully covered with the pulp obtained from blending asbestos (10 g.) in methanol (400 ml.), and the methanol then was removed by vacuum filtration. After sucking to dryness on the filter head, the product from this operation was a mesh-like, pyrotechnic sheet laminated between two, thin, asbestos papers.

This represented a typical procedure for preparing laminated mesh type sheets having an average pyrotechnic content of 0.037 g./sq. cm. However, the sheets burn readily by virtue of the fact that the pyrotechnic materials, being distributed in the mesh-like pattern, have an actual thickness corresponding to a weight-unit area of 0.075 g./sq. cm.

While preferred embodiments of this invention have been disclosed herein, those skilled in the art will appreciate that changes and modifications may be therein without departing from the spirit and scope of this invention as defined in the appended claims.

What is claimed is:

1. A self-propagating chemical heating device in the form of a thin, flexible sheet that is paper-like in physical structure in that said sheet is comprised of a matrix of intermingled fibres; said sheet also including a composition of matter bound by and distributed throughout said fibres, said composition of matter comprising a mixture of powdered materials adapted to undergo an exothermic chemical reaction with each other upon ignition, at least one of the components of said mixture being insoluble in water; the weight of said fibres being from about 2% to 20% of the weight of said composition of matter, an amount of said fibres in excess of 1% of the weight of said composition of matter being asbestos fibres; the weight per unit area of said sheet and the distribution of said composition of matter throughout said sheet being such that said chemical reaction is self-propagating.

2. A self-propagating chemical heating device in the form of a thin, flexible composite sheet, said composite sheet comprising first, second and third sheets with said second sheet being laminated between said first and third sheets, said first, second and third sheets being paper-like in physical structure in that they are each comprised of a matrix of intermingled fibres; said second sheet also including a composition of matter bound by and distributed throughout said fibres of said second sheet, said composition of matter comprising a mixture of powdered materials adapted to undergo an exothermic chemical reaction with each other upon ignition, at least one of the components of said mixture being insoluble in water; the weight of said fibres of said second sheet being from about 2% to 20% of the weight of said composition of matter, an amount of said fibres of said second sheet in excess of 1% of the weight of said composition of matter being asbestos fibres; the weight per unit area of said second sheet and the distribution of said composition of matter throughout said second sheet being such that said chemical reaction is self-propagating.

3. A self-propagating chemical heating device according to claim 1 wherein said mixture of powdered materials is selected from the class consisting of iron and sulphur; iron, zinc and sulphur; lead and sulphur; iron, lead and sulphur; iron oxide ($Fe_2O_3$) and calcium silicide; iron oxide ($Fe_3O_4$) and calcium silicide; lead oxide ($Pb_3O_4$) and calcium silicide; and aluminum, silicon and lead chromate.

4. A self-propagating chemical heating device according to claim 1 wherein said fibres comprise a mixture of asbestos and glass fibres.

5. A self-propagating chemical heating device according to claim 1 wherein said mixture of powdered materials is a mixture of powdered iron and sulphur, the weight ratio of iron to sulphur being between about 75:25 and 65:35, and the weight per unit area of said sheet being in excess of about 0.1 lb./sq. ft.

6. A self-propagating chemical heating device according to claim 4 wherein the weight of said fibres is from about 2-10% of the weight of said composition of matter.

7. A self-propagating chemical heating device according to claim 1 wherein said fibres are selected from the class consisting of asbestos fibres and mixtures of asbestos and glass fibres.

8. A self-propagating chemical heating device according to claim 1 wherein said sheet is in the form of a mesh.

9. A self-propagating chemical heating device according to claim 2 wherein said mixture of powered materials is selected from the class consisting of iron and sulphur; iron, zinc and sulphur; lead and sulphur; iron, lead and sulphur; iron oxide ($Fe_2O_3$) and calcium silicide; iron oxide ($Fe_3O_4$) and calcium silicide; lead oxide ($Pb_3O_4$) and calcium silicide; and aluminum, silicon and lead chromate.

10. A self-propagating chemical heating device according to claim 2 wherein said second sheet is in the form of a mesh.

11. A self-propagating chemical heating device according to claim 2 wherein said mixture of powder materials is a mixture of powered iron and sulphur, the weight ratio of iron to sulphur being between about 75:25 and 65:35, and the weight per unit area of said second sheet being in excess of about 0.1 lb./sq. ft.

12. A self-propagating chemical heating device according to claim 11 wherein the weight of said fibres of said second sheet is from about 2–10% of the weight of said composition of matter.

13. A self-propagating chemical heating device according to claim 2 wherein said fibres of said second sheet are selected from the class consisting of asbestos fibres and mixtures of asbestos and glass fibres.

14. A self-propagating chemical heating device according to claim 13 wherein said first and third sheets consist of fibres selected from the class consisting of asbestos fibres and mixtures of asbestos and glass fibres, the percentage by weight of glass fibres in each of said first and third sheets being less than about 90%.

References Cited by the Examiner

UNITED STATES PATENTS

| 875,345 | 12/1907 | Goldschmidt | 126—263 |
| 2,388,466 | 11/1945 | Caldwell | 44—3 X |
| 2,667,865 | 2/1954 | Herman | 126—263 |

FOREIGN PATENTS

| 515,136 | 8/1955 | Canada. |
| 575,506 | 2/1946 | Great Britain. |

DANIEL E. WYMAN, *Primary Examiner.*

C. F. DEES, *Assistant Examiner.*